Patented June 11, 1935

2,004,594

UNITED STATES PATENT OFFICE 2,004,594

SILICON CARBIDE REFRACTORY

Raymond C. Benner and Henry N. Baumann, Jr., Niagara Falls, N. Y., assignors to The Carborundum Company, Niagara Falls, N. Y., a corporation of Pennsylvania No Drawing. Application January 28, 1932, Serial No. 589,527

5 Claims. (Cl. 106—9)

Our invention relates to refractory articles, such as brick, recuperators, furnace linings, cements, and the like, and particularly to refractories made from silicon carbide and to the method of producing same.

This application is a continuation in part of a copending application by the same inventors and having the Serial No. 269,075, filed April 11, 1928. The said application No. 269,075 claimed silicon carbide refractory articles and a bond therefor, the bond being inert under reducing conditions at a temperature of at least 1300° C.

Silicon carbide is the best conductor of heat commercially available for use at temperatures above 1100° C., the heat resistant alloys, such as chrome iron and similar refractory alloys, having an upper limit of about 1100° C. when their useful life is considered.

In silicon carbide refractories as ordinarily made the silicon carbide is bonded with materials which (after the brick is burned even if not before) contain a major proportion of silica. Clays, silicate of soda, compounds or mixtures of silica and alumina, and fine silicon carbide which oxidizes to silica upon burning unless protected in some way, are representative of the bonds regularly used. Such siliceous bonds are destroyed by reaction with reducing gases at high temperatures, and as a result the refractory is disrupted or at best left without bond around the individual particles to protect them from oxidation on a subsequent furnace cycle. Such subsequent oxidation produces a new supply of silica which is in turn broken down when the furnace gases are again reducing, and the vicious cycle continues to the point where the refractory is totally unfit for further use. The fact that refractories made from granular materials are all more or less permeable to gases renders the effect just described all the more severe as disintegration takes place throughout the whole body of the refractory rather than merely on the outer faces.

In patents to F. J. Tone, No. 992,698 and No. 1,013,700, there is disclosed another type of silicon carbide refractory made from silicon carbide without the use of any foreign bonding material. This type of refractory is very costly to manufacture, and, although it is more resistant to reducing conditions at high temperatures than the first type by reason of the absence of any siliceous bonding material, its porosity exposes the silicon carbide to oxidation.

Prior to the work of the present applicants the phenomena causing destruction of the bonded refractories seem not to have been generally recognized. When we had determined the cause we searched for means to overcome the trouble, and have discovered such means in the form of bonds which coat the silicon carbide grains and protect them from oxidation and which are not disrupted by reducing atmospheres or by reduction by the silicon carbide itself at temperatures up to about 1500° C., this temperature being the limiting value which is encountered in any ordinary furnace. Refractories so bonded are thus superior to either the bonded refractories hitherto produced or the recrystallized type in that they are inert to both oxidizing and reducing conditions.

The refractory material made in accordance with the present invention is especially applicable for use in recuperators, radiating combustion units of the Cannon type, muffles, tunnel kilns, enameling furnaces, coke ovens, zinc retorts, and in fact, in any place where a refractory is required to have a high heat conductivity between temperatures of 1000° C. and 1500° C., at which temperatures metallic heat conductors do not give a comparable service.

As means of forming a refractory which shall be resistant to both oxidizing and reducing conditions, we find a number of bonds to be suitable. These are composed in some cases of a single compound and in others of a mixture of materials, but all have in common the ability to resist reduction when admixed with silicon carbide and to protect the silicon carbide from substantial oxidation. Many of these bonds contain an alkaline earth compound in some form and all are free or substantially free of silica and soften or mature at temperatures between 1200° C. and 1600° C. so that when admixed with silicon carbide in suitable proportions they set to form a serviceable refractory on firing to kiln temperatures from 1250° C. to 1450° C.

Examples of bonds which can be used and their maturing temperatures follow:

| Composition | Maturing temperature |
|---|---|
| Calcium fluoride | 1400° C. |
| Aluminum fluoride | 1600° C. |
| Magnesium chloride | 1400° C. |
| Lime 25–35%—rutile 65–75% | 1400–1500° C. |
| Lime 65–75%—rutile 25–35% | 1350–1500° C. |
| Fluorite (A') 65–75%—bone ash 25–35% | 1300° C. |
| Magnesia 15–40%—Hematite 60–85% | 1400–1600° C. |
| Alumina 65–75%—rutile 25–35% | 1500–1600° C. |
| Fluorite (powdered) 65–90%—Calcium fluoride (precipitated) 10–35% | 1400° C. |

Certain of these bonds in addition to being resistant to reduction, exhibit an additional desirable characteristic in that they are continuously maturing bonds as described in our co-pending application, Serial No. 630,494 filed August 26, 1932 as a continuation of our earlier applications Nos. 268,364 and 349,739 filed April 7, 1928 and March 26, 1929 respectively. These continuously maturing bonds are such that a portion thereof softens at a temperature low enough to cause the bond to protect the silicon carbide against oxidation while the refractory is being burned, and the remaining portion dissolves progressively in the softened portion as the temperature is raised, thereby preventing the bond from becoming highly fluid under heat and retaining its protective value over a very wide temperature range.

The bonding materials should be thoroughly pulverized before use. Those containing more than a single ingredient may be sintered or fritted and then pulverized in order to insure their maturing promptly in the lower range of kiln temperatures. While the proportion of bond to grain is not particularly critical the best results are secured with between 5 and 15% of bond by weight, 10% being a fair average. The mixture of fluorite and chemically precipitated calcium fluoride imparts a certain degree of plasticity to the mix which renders it easy to work with.

In carrying out the invention according to our preferred practice, we use 16 and finer mesh silicon carbide grain. The proper amount of bond is added to the grain and the whole thoroughly mixed in a mixer of the kneader type, or in any type of mixer which will thoroughly mix the bond and the grain. An inert filler, such as finely crushed fused aluminum oxide, may also be mixed with the mass for the purpose of increasing the density of the final product. We may or may not use a temporary binder such as glucose, dextrin, glutrin, etc., which is burned out and totally eliminated in the first firing of the refractory.

After the mix has been made it is dry pressed under extremely heavy pressure. While we prefer, especially for bricks and special forms and shapes, to have a dry mix using a minimum amount of water, we have found that, when using our invention for plastic refractories or in cement form, a relatively wet mixture is necessary.

After the bricks or shapes have been formed, they are fired to mature the bond in any suitable furnace such for instance as an ordinary periodic or tunnel kiln where temperatures of 1450° C. obtain. The firing should be so conducted as to avoid excessive oxidation of the silicon carbide at temperatures below that at which the bond matures to protect the grain. This can be done for example by maintaining a non-oxidizing kiln atmosphere while the temperature is being raised through the range in which silicon carbide oxidizes and below the temperature at which the bond matures.

Silicon carbide bricks and forms containing these bonds remain unaffected when heated up to 1400 and 1500° C. and even in some cases the bricks remain unaffected at temperatures of 1600° C. in an atmosphere containing as high as 30% of carbon monoxide for a period of from 8 to 12 hours, whereas ordinary silicon carbide brick and other brick bonded in part or in whole by silicates, such as fire clay brick, silica brick, chrome brick, etc., are disintegrated because of the destruction of the siliceous bond. In addition to articles bonded in accordance with our invention, only recrystallized silicon carbide which contains no bond other than silicon carbide itself, as disclosed in said Tone patent, has been found able to withstand this treatment.

Another important characteristic of the bonds which we use is that they wet the silicon carbide grains thus forming a protective coating for the grains which will protect the individual grains from any attack by gases to which the refractory is exposed. Bonds which we propose to use, in addition to being highly resistant to oxidizing conditions at extremely high temperatures, produce a high apparent density in the completed article when the proportion of various grit sizes of silicon carbide is adjusted to give a dense mix, using practices which are well known to those familiar with the refractory art. The minimum apparent density for a silicon carbide refractory should be of the order of 2.3 or greater, and such an apparent density can be secured by the use of the bonds herein specified. By the use of the bonding material and an inert filler, a very high apparent density is secured. The high apparent density reduces the permeability of the mass and increases the mechanical strength.

By the use of silicon carbide in combination with a binder, such as one of the alkaline earth containing binders herein disclosed, or the other binders herein noted, a refractory article is secured of extremely low permeability, its permeability in any direction being less than 250 units, the unit being determined according to the method disclosed in U. S. Patent No. 1,789,131 to Benner and Easter, issued January 13, 1931, for a refractory article and furnace lining made therefrom.

While we have described particular binders and the method of mixing and burning, it will be understood that this is merely by way of illustration and that various changes and modifications may be made within the contemplation of our invention and under the scope of the appended claims.

We claim:

1. A refractory article comprising silicon carbide and a bond containing calcium fluoride.

2. A refractory article comprising a mass of silicon carbide grains and a binder, said binder comprising a mixture of an alkaline earth fluoride and an alkaline earth phosphate.

3. A refractory article comprising a mass of silicon carbide grains and a binder containing a mixture of fluorite and bone ash, said article being non-reactive under reducing conditions up to approximately 1600° C.

4. A refractory article composed of silicon carbide grains and a binder, the binder comprising a member of the group of compounds consisting of the fluorides and chlorides of alkaline earth metals.

5. A refractory article comprised of refractory carbide grains and a binder stable under reducing conditions at a temperature of at least 1300° C. and in which an alkaline earth fluoride is a constituent of the binder.

RAYMOND C. BENNER.
HENRY N. BAUMANN, Jr.